Nov. 5, 1963  J. ROZUM  3,109,336
MULTIPLE TOOL HOLDER FOR LATHES OR LIKE MACHINES
Filed Dec. 20, 1961  3 Sheets-Sheet 1
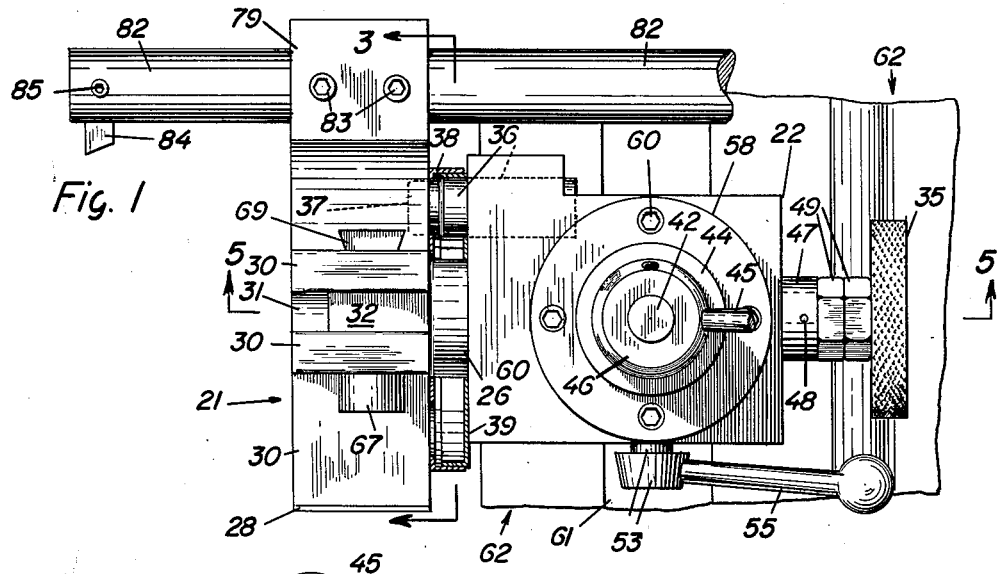
INVENTOR
John Rozum
by James J. Cannon.
Attorney

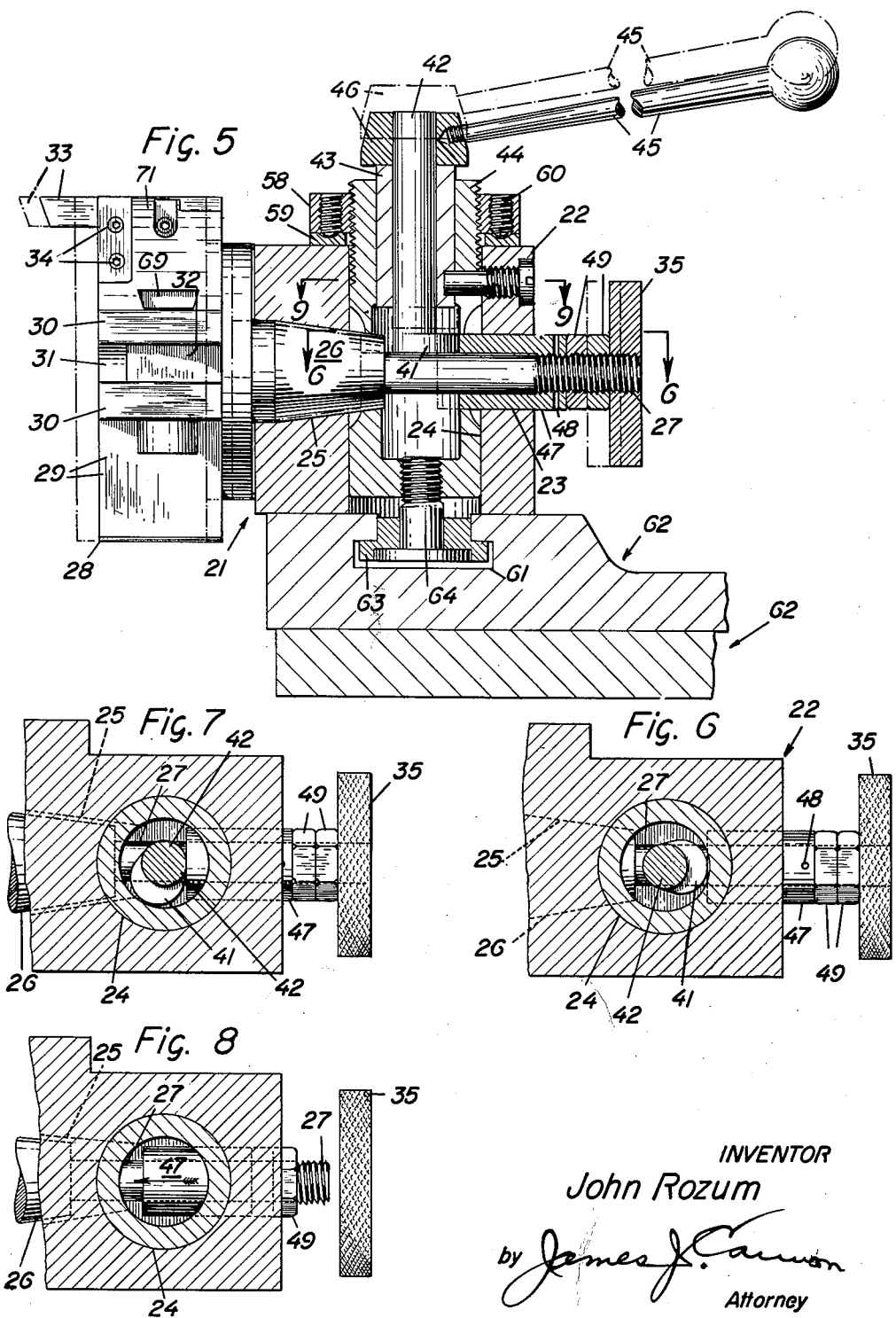

Nov. 5, 1963 J. ROZUM 3,109,336
MULTIPLE TOOL HOLDER FOR LATHES OR LIKE MACHINES
Filed Dec. 20, 1961 3 Sheets-Sheet 3
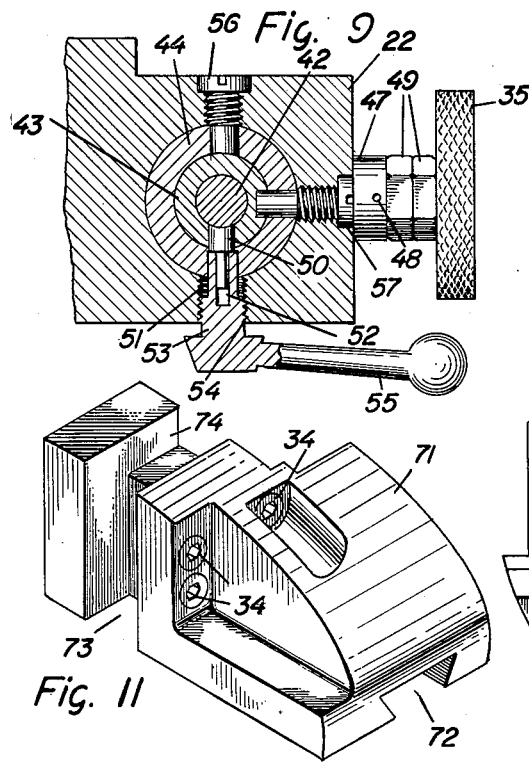
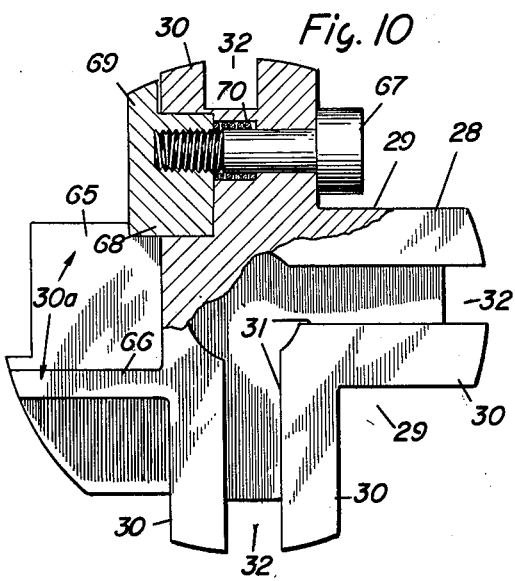
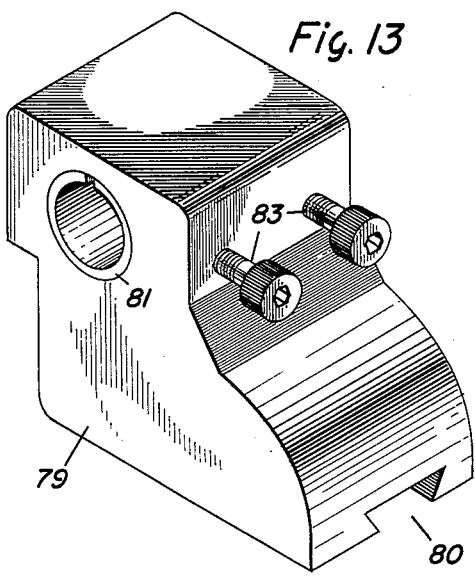
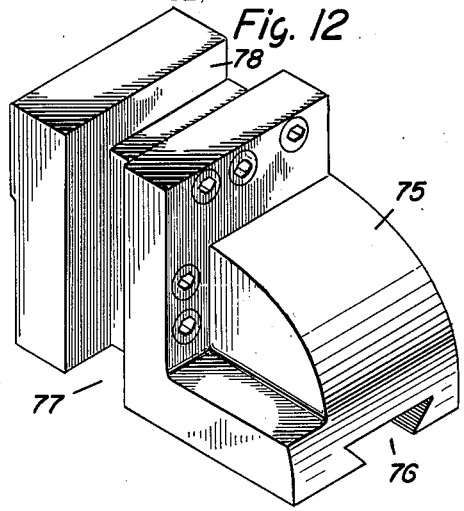
INVENTOR
John Rozum
by James J. Cannon.
Attorney

3,109,336
MULTIPLE TOOL HOLDER FOR LATHES OR LIKE MACHINES
John Rozum, 42 Plauderville Ave., Garfield, N.J.
Filed Dec. 20, 1961, Ser. No. 160,714
4 Claims. (Cl. 82—36)

The present invention relates to a quickly replaceable and adjustable multiple tool holder for lathes or like machines, and it consists in the combinations, constructions and arrangements of parts hereinafter described and claimed.

Generally there is provided a block-shaped steel head or tool post adjustably mounted on a conventional compound slide of a lathe or like machine. The head is provided with a large diameter vertical bore and an intersecting horizontal bore conically tapered at one end thereof. A shaft having a reduced diameter central portion and a conically tapered end portion is rotatably and axially displaceably movably mounted in the horizontal bore. A disc-shaped holder for a plurality of removable cutting tools is coaxially fixed to one end of said shaft. An easily removable disc nut is screwed onto the other end of said shaft to prevent inadvertent axial displacement of the shaft from its bore. The head has a stud or post projecting from its front face, and the tool holder has a plurality of equally spaced cooperating bores selectively engageable over the post to locate and hold the tool holder in desired positions of rotation thereof corresponding to the tool bit to be used for any one cutting operation. Axial movements of the shaft provide the locking and unlocking actions of the stud relative to its mating apertures in the tool holder.

The axial movements of the shaft are effected by a cam alternately engageable with cam followers formed by shoulders defined by a reduced diameter central portion of the shaft. The cam is fixed to the lower end of a cam shaft coaxially mounted in a pair of guide sleeves removably positioned in the aforesaid vertical bore in the head. The cam shaft is rotatable by a lever attached to its upper end and is also axially liftable by said lever to withdraw the cam from the cam follower groove between the shoulders aforementioned, to permit quick and easy removal of the tool holder for alteration thereof or for replacement by another interchangeable holder.

It is an object of the present invention to provide a multiple tool holder for lathes or like machines which holder is capable of quick and easy working positioning of selected ones of the multiple tools mounted thereon.

It is another object of the invention to provide a multiple tool holder of the character described which is quickly and easily interchangeable with another similar holder set up for performing another series of machine operations.

It is a further object of the invention to provide a tool holder of the type disclosed in which the same mechanism is differently operated to effect positioning of the multiple cutting tools and to effect replacement of the tool holder as a unit.

It is yet another object of this invention to provide a device of the character described in which the tool holder is mounted on a conically tapered shaft which is axially displaceable in a similarly tapered bore by a cam which cam is rotatable to lock and unlock said shaft and is axially displaceable to permit withdrawal of said shaft for replacement of said tool holder.

It is a further object of the invention to provide a multiple tool holder of type disclosed having a plurality of selectively usable adaptors for attaching cutting tools thereto in extended and/or unusual positions.

Other and further objects of the invention will become apparent from a reading of the following specification taken in conjunction with the drawings, in which:

FIGURE 1 is a plan view, partly broken away, of the tool holder with an adaptor attached, FIGURE 2 is a front elevational view of a preferred embodiment of the invention, FIGURE 3 is an elevational view in section taken on line 3—3 of FIGURE 1, FIGURE 4 is a front elevational view of one of the nesting positioning cups, FIGURE 5 is a side elevational view of the showing of FIGURE 1 partly in section taken on line 5—5 of FIGURE 1, FIGURE 6 is a fragmentary plan view in section taken on line 6—6 of FIGURE 5, FIGURE 7 is a view similar to FIGURE 6 but showing the cam in its shaft unlocking position, FIGURE 8 is a view similar to FIGURE 6 showing the shaft in the process of being removed, FIGURE 9 is a plan view in section taken on line 9—9 of FIGURE 5, FIGURE 10 is a front elevational view, partly broken away, of the tool holder disc, FIGURE 11 is a perspective view of one species of adaptor, FIGURE 12 is a perspective view of a second form of adaptor, and FIGURE 13 is a perspective view of the adaptor illustrated in FIGURE 1.

Reference is now made to the drawings wherein the numeral 21 generally designates the tool holder as a unit. The unit comprises a rectangular metallic tool post or head 22 provided with a pair of centrally intersecting horizontal and vertical bores 23 and 24, respectively, extending through the head 22 (FIG. 5).

The horizontal bore 23 is conically tapered at its left end at 25 for mating engagement with a similarly tapered portion 26 of a shaft 27 to provide a releasable binding or gripping action by axial movement between the shaft 27 and the head 22 for a purpose explained hereinafter.

The left end of the shaft 27 has axially fixed thereto a massive initially disc-shaped tool holder 28. The tool holder 28 has sector-shaped notches 29 cut longitudinally in its periphery to define a plurality of radially extending massive arms 30. Each arm 30 has a radial groove 31 cut into its front face and an intersecting longitudinally extending groove 32 cut into its peripheral surface. The grooves 31 and 32 are adapted to receive cutting tools 33, held therein by set screws 34, oriented either perpendicular to or parallel to the axis of the shaft 27, as shown respectively by FIGS. 2 and 5.

One of the arms, namely 30a, and adjacent structure are modified and augmented as hereinafter described for attachment thereto of any one of the adaptors of FIGS. 11, 12 and 13, also described below.

When a selected one of the cutting tools 33 is moved into operative position relative to a work piece (not shown) by rotation of the shaft 27 by a small knurled wheel or disc nut 35, the cutting tool is locked in said operative position by a stud 36 (FIGS. 1 and 3) protruding from a bore in the front face of the block-shaped head 22 and snugly engageable in one of several tool positioning sockets 37 drilled in the rear face of the tool holder 28.

A pair of nesting shallow cups 38 and 39 is interposed between the opposed faces of parts 22 and 28 to prevent shavings from entering the space between said faces and interfering with mating of the stud 36 with a selected one of the sockets 37. The cups 38 and 39 are provided with apertures 40 aligned with the stud 36 and the sockets 37.

While the stud 36 and any one of its mating sockets 37 accurately position a selected one of the cutting tools 33, it should be noted that the major part of the forces holding the shaft 27 against rotation by the cutting operation are provided by the tightly engaged mating tapers 25 and 26 of the bore 23 and the shaft 27, respectively. The tapers are of the order of 7 to 8 degrees to provide good braking and also quick and easy engagement and release.

The shaft 27 is moved axially to and from its position of FIGS. 5 and 6 (in which the tapered surfaces 25 and 26 are tightly engaged) by a cam 41 fixed to a cam shaft 42 axially positioned in the vertical bore 24 by a pair of coaxial sleeves 43 and 44. The shaft 42 is rotated and lifted by a handle lever 45 attached to the upper end of said shaft by a collar 46.

The cam 41 acts against the truncated inner end of the tapered portion 26 of the shaft 27 to effect disengagement of the tapered surfaces 25 and 26, and it acts against a sleeve 47 adjustably screwed onto the threaded right end of the shaft 27. A diametrical transverse bore 48 provides sockets engageable by a pin-type wrench for adjustment of the sleeve 47 along the shaft 27. Lock nuts 49 fasten the sleeve 47 and the disc nut 35 against accidental movements. When the cam shaft 42 is lifted (as shown in phantom in FIG. 5) it permits removal of the shaft 27 and the tool holder 28 (after removal of the disc nut 35) in the direction of the arrow in FIG. 8.

The cam shaft 42 is locked in its dead-center cutting operation position of FIGS. 5 and 6 by a pin 50 having a cylindrically hollow ground end embracing the surface of said shaft, as shown in FIG. 9. The pin 50 has a reduced diameter stem 51 free-floatingly engaged in a coaxial bore 52 in a shaft 53. The shaft 53 is externally threaded for being screwed into a threaded bore in 54 in the head 22. The shaft 53 has a lever 55 fixed thereto for rotating said shaft to effect locking clamping movement of the brake pin 50 against the cam shaft 42.

The coaxial sleeve 43 and 44 are held against rotation and against excessive axial movements in the vertical bore 24 by a pair of threaded-shank pins 56 and 57 the ends of which enter vertically elongated slots in said sleeves. The outer sleeve 44 is vertically movable by an internally threaded ring 58 engageable with external threads on the sleeve 44. The ring 58 rests on a washer 59 which protects the top surface of the head 22 from marring. Set screws 60 are employed to lock the tool post 22 in position.

The ring 58 is rotated to clamp and to release the head in adjusted positions along an undercut groove 61 in the upper surface of a lathe compound slide generally designated 62. A T-slide 63 is connected to the sleeve 44 by a screw 64, which transmits the pull, applied by the ring 58 to the sleeve 44, to the T-slide 63 to clamp the head 22 to the lathe compound slide 62.

As noted above, one of the arms, namely 30a (FIG. 10), is modified to accommodate any one of the adaptors of FIGS. 11, 12 and 13. The arm 30a is L-shaped in radial view and comprises a block 65 and a web 66 defining a seat for receiving the squared ends of the adaptors aforementioned. The adjacent arm 30 of the tool holder 28 is transversely bored to receive the shank of a screw 67 therethrough (FIG. 10), and is also provided with a squared socket to receive the squared base 68 of a dovetailed fastener 69 over and onto which the undercut-grooved bases of the adaptors are designed to fit. Tightening the screw 67 then locks the adaptor in the seat formed by and between the block 65 and the web 66 of the special arm 30a. A coil spring 70 urges the fastener 68—69 toward the adaptor releasing position thereof.

The adaptor of FIG. 11 comprises a block 71 grooved at 72 for locking engagement with the fastener 69, as shown in FIGS. 2 and 5. The adaptor of FIG. 11 converts the tool holder into one having four bit holders of the same sizes and shapes. Said adaptor block 71 also has intersecting bit-receiving grooves 73 and 74 corresponding to the grooves 31 and 32, respectively, in the arms 30. The adaptor of FIG. 12 is larger than the one of FIG. 11 but is very similar in general construction. Its body 75 is provided with an undercut groove 76 for fastening cooperation with part 69 above described. The radial groove 77, the horizontal groove 78, and set screws 34 perform the same functions as the equivalent parts in the smaller adaptor of FIG. 11.

The adaptor of FIG. 13 comprises a body 79 having an undercut groove 80 similar in form and function to grooves 72 and 76 above described. The body 79 has a longitudinally extending cylindrical bore therethrough lined by a split sleeve 81. The sleeve 81 snugly receives therein an adjustable cylindrical bar 82 (FIG. 1). A pair of set screws 83 holds the bar in desired positions of rotation and translation by clamping the sleeve 81 tightly thereagainst. The ends of the bar 82 are diametrically notched to receive cutting bits 84, held in the notches by set screws 85.

While several forms of the invention have been shown and described herein, it will be readily apparent to those skilled in the art that many minor modifications may be made without departing from the spirit of the invention or the scope of the appended claims.

What is claimed is:

1. A tool holder for lathes or like machines, comprising: a head, means for adjustably connecting said head to said lathe, said head having a pair of intersecting bores therethrough, a shaft rotatable and axially movable in one of said bores, a disc-shaped tool holder body coaxially fixed to one end of said shaft, tool holding means peripherally spaced on and around said body, mating positioning and locking means connected to said head and body and engageable and disengageable by axial movements of said shaft in said first-mentioned bore, said shaft having opposed spaced shoulders medially thereof, a cam alternately engageable with said shoulders for effecting locking and unlocking axial movements of said shaft and body, a cam shaft fixed at one end thereof to said cam and journaled in the other of said intersecting bores, and means for rotating said cam shaft and thereby said cam, at least one of said shoulders being formed by a sleeve axially adjustably mounted on said shaft for accurate positioning of said sleeve at the dead center position of said cam for maximizing the locking and unlocking forces produced thereby, and for minimizing the manual forces required for said operations.

2. A tool holder for lathes or like machines, comprising: a head, means for adjustably connecting said head to said lathe, said head having a pair of intersecting bores therethrough, a shaft rotatable and axially movable in one of said bores, a disc-shaped tool holder body coaxially fixed to one end of said shaft, tool holding means peripherally spaced on and around said body, mating positioning and locking means connected to said head and body and engageable and disengageable by axial movements of said shaft in said first-mentioned bore, said shaft having opposed spaced shoulders medially thereof, a cam alternately engageable with said shoulders for effecting locking and unlocking axial movements of said shaft and body, a cam shaft fixed at one end thereof to said cam and journaled in the other of said intersecting bores, and means for rotating said cam shaft and thereby said cam, said cam shaft also being axially displaceable by said rotating means whereby said cam can be withdrawn from between said shoulders on said shaft to permit removal of said shaft and tool holder body from said head for retooling or replacement thereof, at least one of said shoulders being formed by a sleeve axially adjustably mounted on said shaft for accurate positioning of said sleeve at the dead center position of said cam for maximizing the locking and unlocking forces produced thereby, and for minimizing the manual forces required for said operations.

3. A tool holder for lathes or like machines, comprising: a head, means for adjustably connecting said head to said lathe, said head having a pair of intersecting bores therethrough, a shaft rotatable and axially movable in one of said bores, a disc-shaped tool holder body coaxially fixed to one end of said shaft, tool holding means peripherally spaced on and around said body, mating positioning and locking means connected to said head and body and engageable and disengageable by axial movements of said shaft in said first-mentioned bore, said shaft having opposed spaced shoulders medially thereof, a cam alternately engageable with said shoulders for effecting locking and unlocking axial movements of said shaft and body, a cam shaft fixed at one end thereof to said cam and journaled in the other of said intersecting bores, and means for rotating said cam shaft and thereby said cam, said means for adjustably connecting said head to said lathe comprising a vertical axis externally threaded sleeve surrounding said cam shaft, a threaded ring around the upper end of said sleeve and bearing against said head, and a slide bar carried by the lower end of said sleeve and receivable in an undercut groove in a lathe compound slide, whereby turning said ring on said sleeve will clamp said head to said lathe compound slide in desired adjusted positions thereon.

4. A tool holder for lathes or like machines, comprising: a head, means for adjustably connecting said head to said lathe, said head having a pair of intersecting bores therethrough, a shaft rotatable and axially movable in one of said bores, a disc-shaped tool holder body coaxially fixed to one end of said shaft, tool holding means peripherally spaced on and around said body, mating positioning and locking means connected to said head and body and engageable and disengageable by axial movements of said shaft in said first-mentioned bore, said shaft having opposed spaced shoulders medially thereof, a cam alternately engageable with said shoulders for effecting locking and unlocking axial movements of said shaft and body, a cam shaft fixed at one end thereof to said cam and journaled in the other of said intersecting bores, and means for rotating said cam shaft and thereby said cam, said cam shaft also being axially displaceable by said rotating means whereby said cam can be withdrawn from between said shoulders on said shaft to permit removal of said shaft and tool holder body from said head for retooling or replacement thereof, said means for adjustably connecting said head to said lathe comprising a vertical axis externally threaded sleeve surrounding said cam shaft, a threaded ring around the upper end of said sleeve and bearing against said head, and a slide bar carried by the lower end of said sleeve and receivable in an undercut groove in a lathe compound slide, whereby turning said ring on said sleeve will clamp said head to said lathe compound slide in desired adjusted positions thereon.

References Cited in the file of this patent
UNITED STATES PATENTS

| | | |
|---|---|---|
| 2,471,613 | Fry | May 31, 1949 |
| 2,513,586 | Rebmann | July 4, 1950 |
| 2,571,559 | Gaillard | Oct. 16, 1951 |
| 2,621,396 | Gracchi | Dec. 16, 1952 |
| 2,745,306 | Schmidt | May 15, 1956 |

FOREIGN PATENTS

| | | |
|---|---|---|
| 127,289 | Australia | Apr. 15, 1948 |